June 4, 1968

L. J. ABALO 3,386,838

PROCESS FOR THE PRODUCTION OF PARTIALLY DEHYDRATED FRUITS
ESPECIALLY OF THE GENUS MUSA

Filed Nov. 27, 1967

INVENTOR
LUIS J. ABALO

BY *Semmes and Semmes*

ATTORNEYS

United States Patent Office 3,386,838
Patented June 4, 1968

3,386,838
PROCESS FOR THE PRODUCTION OF PARTIALLY DEHYDRATED FRUITS ESPECIALLY OF THE GENUS MUSA
Luis Jose Abalo, Box 622, Guanica, San Juan, Puerto Rico 00653
Continuation-in-part of application Ser. No. 392,290, Aug. 26, 1964. This application Nov. 27, 1967, Ser. No. 685,853
11 Claims. (Cl. 99—204)

ABSTRACT OF THE DISCLOSURE

Process for preserving natural fruit products such as bananas for edible consumption. Peeled bananas are slightly compressed between juice absorbent boards while exposed to the sun, rested periodically as at night and the process continued until the preserved product is thus naturally created, free of caramelization, tissue deterioration and the like. Mild sulphitization may precede the process to enhance the non mold quality of the product.

Cross-references to related applications

This application is a continuation-in-part of my copending application Ser. No. 392,290, filed Aug. 26, 1964, entitled: Process for the Production of Partially Dehydrated Fruits Especially of the Genus Musa and Products Thereof, now abandoned.

Description of the prior art

Whereas numerous processes have been devised for the preservation of fruits including bananas and the like, with few exceptions, none has resulted in the highest possible retention of the natural fluids and juices of the fruit without the addition of fungicides, preservatives and/or fermentation preventatives. This is so, particularly when the fruit must be peeled before dehydrating, because the skin, as in the case of bananas, is not edible. The most recent developments involve substantially total desiccation of the fruit, resulting in the hardening of the product, and partial or total loss of its natural flavor. In the very few cases where total desiccation has been overcome, the process is either costly or impracticable. Among the more advanced processes involving a usage of the natural sun is that of Mayne R. Coe, Patent 2,481,723, in which practically all rays of sunlight below 4,900 angstrom units and between 6,300 to 6,700 angstrom units of the spectrum are admitted to the fruit during the process. Additionally, Joseph Fry as early as 1869 in Patent 93,075 had envisaged that the specific fruits, in order to be cured, must be kept at a process heating point which was above that producing fermentation and below that which roasts or cooks. Undoubtedly, this is the case where fruits must be peeled before dehydrating because of their inedible skin, and it is a fact that the skin retards fermentation; but Fry does not say anything about any practical or economic method or process for yielding the desired product.

Rey Patent 2,192,273 and Harris et al. Patent 1,017,411 are examples of prior art. By the Rey process which is a kneading process, a substantially different effect is obtained than through the present process. Rey produces a bruised fruit which enhances the precipitation of carbon hydrates and promotes fermentation, whereas the present process involves a means of substituting for the inedible skin, moisture absorbent boards, the primary function of which is not to press upon the fruit or to knead it as in Rey, but to cover and to contact it and to extend this covering and contacting to at least a major portion of the surfaces of the fruit. The present process yields a cured natural intact fruit including all exterior tissue, rather than a semi-dehydrated bruised fruit. This is not a roasting process as called for in the Harris patent.

Summary of the invention

The present process, unlike the prior art, is designed to use the heat of the sun over an extended period of time, while at the same time shielding the banana product from substantially all direct rays of the sun. The process involves intermittently "resting" the product from heat produced by the sun, all the while compressing same. The new product is tasteful, and of a long shelf-life.

The objects of the invention are as follows:

A process for the creation of new products derived from the natural fruit family, Musaecae, a process for the preservation thereof in edible forms in which the fruit has been decorticated, the process having as its objective the preparation and preservation of the fruit in edible form without further treatment, such as rehydration.

Unlike most fruits which are normally dried in the sun, the peelings of the species belonging to the genus Musa are not edible. Since this is so, applying the concept of sun-drying in the natural state is rendered impossible. Furthermore, other processes, patented or unpatented, directed to the avoiding of hardening and acidity in cured fruit resulting from sun-ripening and drying after peeling have proved not to be entirely practical or economical, since none have been used in an industrial scale. For the first time, nevertheless, ripening-drying through utilization of a natural source of sun heat is effected for bananas, yielding a product having a similar consistency to the known sun-ripened-dried products like raisins, prunes, dates and the like.

This process is distinguished from both: (a) the ancient and well-known sun-ripening-drying process for fruits having edible skins such as raisins, dates, figs and so forth; and (b) the more general and recent dehydration processes.

The disclosed process differs from the former in that although the pulp of the fruit is exposed, fermentation and hardening are prevented. This invention differs from the latter in that the fruit need not be reconstituted or restored to its initial state before it is eaten.

Finally, this process by its nature results in increased nutritive value, pound for pound of the processed fruit as compared with the fresh or uncured fruit.

The process

Figure 1A:
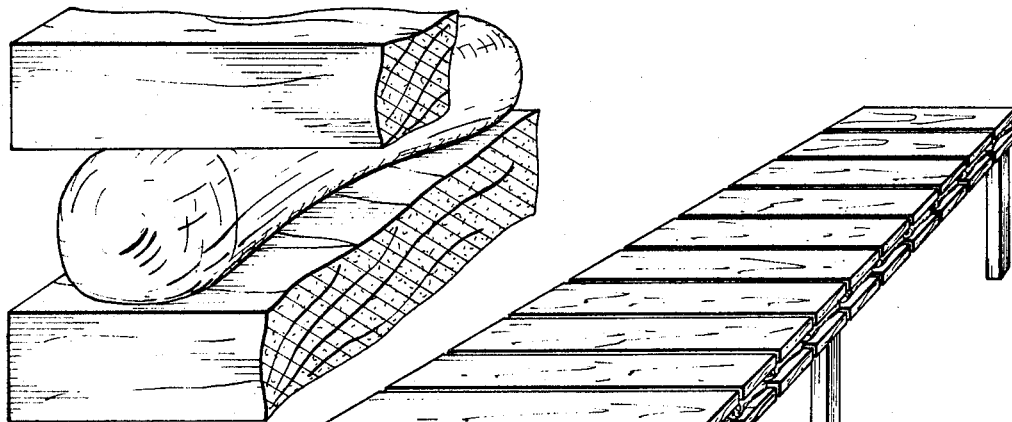
FIGURE 1A is an enlarged schematic of a section of FIGURE 1.
Figure 1:
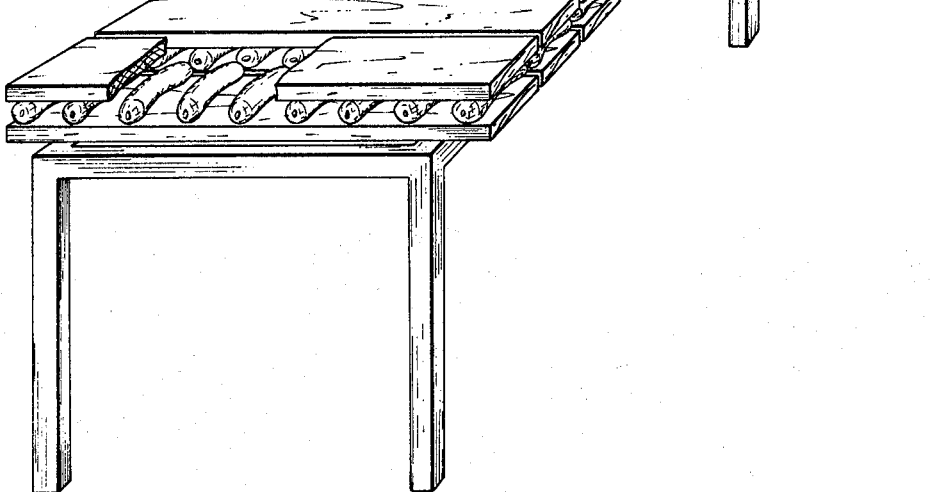
FIG. 1 is a schematic of the initial phase of the process showing rotary positioning.
Figure 2:
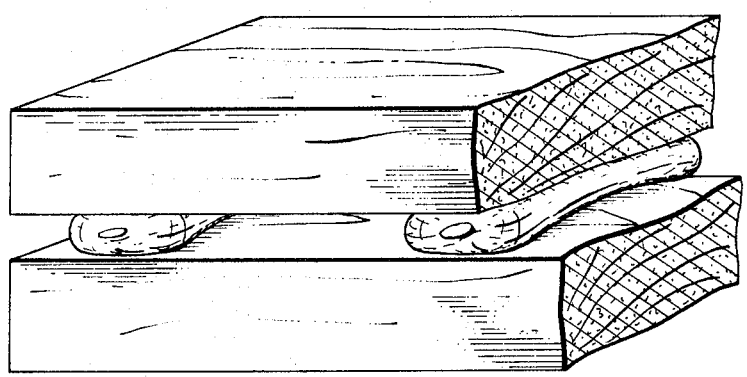
FIG. 2 is a schematic of the same process at completion.

In its preferred form, the process involves first peeling the fruit at the beginning of its ripening stage, in the case of bananas, or washing it. Secondly, the peeled or washed fruit is placed in spaced relation to similar fruits, to facilitate circulation of free air, on wooden boards or planks and covered by corresponding boards or planks which are opposed. Where necessary, due to climatic conditions, the fruit is preliminarily exposed to sulphur fumes or sprayed with solutions of sorbic acid to prevent the growth of mold occurring on the surface of the fruit. Banana fruit which has just turned ripe, that is to say, on either the first or second day following its turning yellow from unripened green, is the fruit, when peeled, that is used in this process.

By gravitational action of the uppermost of the corresponding boards or planks, the fruit is slightly but continuously compressed all through the period of the curing process. In the meantime, the planks or boards will absorb the liquids coming from the heated fruit. The boards or planks have been cured and sap removed, rendering them ideally absorbent of fruit liquids. The particular boards or planks which are used to cover the product are capable of absorbing substantially all the necessary liquids which are to be removed from the product and/or evaporating the absorbed liquids. This moisture absorbing process is enhanced by the squeezing of the partially cured product between the boards or planks and too, a complete 180° rotation each day or at least every other day of the "compress" ensures a substantially even absorption of water from one side of the product to the other. By "compress" is meant the spaced superposition of two boards or planks holding the fruit between opposed inside faces of the boards or planks.

With respect to the particular boards used in this process, the following is a satisfactory example. Pine wood is preferred, although various other woods which have likewise been cured have been used. In a specific instance, the width of the boards is preferably of from ¾" in thickness and two ft. in length having a six inch width. Boards which are in excess of ¾" to ⅞" in thickness absorb too much of the heat and boards which are of substantially less thickness than ¾" to ⅞" have a far too short a life in view of the desired cleaning that must be done to remove the residues of the dried fruit which has adhered. It is desired that the boards not be of excess weight and in the present instance, boards of approximately three pounds having the aforesaid dimensions may be sufficient to confine in a seat of opposed boards nine to ten bananas, separated from each other at least one or two inches, whereby not to press substantially on the bananas, but naturally to descend thereon as the volume of the fruit may be reduced by dehydration.

The fruit is now, while thus placed, almost completely shielded from the sun's rays, and all sides thereof exposed to the atmosphere. While thus positioned, the fruit containing compress is exposed to the sun whereby the heat of the sun commences the curing process for given periods of three to six hours per diem. It is desirable that the confining media be exposed directly, that is to say, at right angles to the position of the sun. To this end, it is within the scope of invention to cause the confining boards or planks to be rotated continuously as the sun moves. In a normal process, exposure for three to six hours per day for a curing period of seven or eight days would suffice for the complete curing process. Naturally, the board or plank compress containing the fruits is relieved of the heat treatment as night falls, thus yielding an 18–21 hour period of cooling in between periods of heating. In order to expose the confined fruit to the sun heated atmosphere the two boards confining the ripe peeled fruit are placed on transparent roof covered trays, so that they may receive the heat of the sun during the number of days required to complete the curing process and remain meanwhile protected from dew and rains.

The form of dehydration itself and the humidity absorbing capacity of the boards are essential but still not the nucleus of this invention; while heat evaporates the liquids of the confined fruits, the fruit volume gets reduced and the fruit itself gets more and more flattened because of the weight of the covering boards. These boards will progressively contact larger and larger areas of the fruit surfaces, protecting them from the burning and hardening action of direct sun rays or hot air draughts. It is by means of this protection, equivalent to the skin's protection of fruits with edible skins, that a perfectly cured product is attained.

While this process has been described with reference to heat derived from the sun, it will be apparent that artificially induced heat and cooling periods may be adopted without departing from the spirit of invention. Likewise, various boards or planks other than preferred cured pine boards may be used and so too, differing means of applying compression to the fruits in the compress may be adopted within the metes and bounds of the invention as claimed. The periods of exposure to the natural or artificial hot and cold atmospheric conditions may also vary, as noted, without departure from the invention, as described and claimed.

I claim:

1. A process for preserving peeled ripe fruit intact, of the genus Musa, such as bananas, by means of exposure of the ripened peeled fruit to sun heated atmosphere, including the following steps:
    (a) initially confining at least one minor portion of the peeled ripe fruit between opposed moisture absorbable boards wherein at least one board is gravitationally movable with respect to the other;
    (b) periodically exposing the confined ripe peeled fruit to the heated atmosphere created by the sun, while shielding the ripe peeled fruit by the boards from direct rays of said sun and periodically relieving the ripe peeled fruit of exposure to the sun-heated atmosphere;
    (c) rotating upside down the opposed boards confining the ripe peeled fruit at least once during the exposure thereof whereby said other board may become gravitationally movable with respect to the first, as the volume of the ripe peeled fruit is reduced by dehydration, the absorbable boards will confine by contact major portions of the exterior surfaces of the confined ripe peeled fruit;
    (d) removing the board from the riped peeled fruit to yield a fully cured soft product all tissues and cells of which are intact.

2. Process according to claim 1 in which the boards comprise a cured highly porous wood material, the thickness of each being no greater than the thickness of the fruits thereof.

3. The process according to claim 2 in which the thicknesses of each board is less than the thickness of the respective fruits.

4. The process according to claim 1 in which the fruit is confined substantially normal to the sun, the sun's rays falling substantially perpendicularly to the confining boards or planks, and further comprising the step of alternately rotating the confining boards or planks 180°, thereby insuring even moisture absorbency from the fruit and moisture evaporation from the boards or planks.

5. The process of claim 1 in which plural fruits are confined in spaced relation to each other for a maximum circulation of free air to unconfined portions thereof.

6. The process of claim 2 in which the respective boards or planks are of sufficient density to shield the confined portions of fruits from all rays of the sun and of sufficient porosity to insure absorbency of the liquids and moisture of the fruit.

7. The process according to claim 1 including an initial step, following peeling and cleaning, of exposing the product to sulphuric atmosphere in the prevention of mold formation.

8. The process according to claim 1 in which the respective periods of exposure and relief are in the approximate ratio of one to five.

9. The process according to claim 8 in which the period of exposure comprises between 3 and 6 hours and the period of relief comprises between 18 and 21 hours, and in which the total process cycle involves from 6 to 8 days.

10. The process according to claim 8 in which the total process cycle involves from 6 to 8 days.

11. A process for preserving peeled ripe fruits intact of the genus Musa, such as bananas, by means of natural exposure to the atmosphere created by the sun, comprising the following steps:
    (a) initially confining one or more ripe peeled fruits between two opposed moisture absorbable boards, both said boards being movable so that they may be periodically rotated upside down with the ripe peeled fruits confined between;

(b) exposing the confined ripe peeled fruit or fruits to the atmosphere created by the heat of the sun by placing the two boards confining the ripe peeled fruit on transparent roof covered trays, so that they may receive the heat of the sun during the number of days required to complete the curing process and remain meanwhile protected from dew and rains;

(c) rotating upside down each set of both boards with the confined ripe peeled fruit or fruits between one or more times during the curing period in order to assure that sun heat will be approximately equivalent by both sides; as the volume of the ripe peeled fruit is reduced by dehydration, the absorbable boards will confine by contact major portions of the exterior surfaces of the confined ripe peeled fruit;

(d) and removing the ripe peeled fruit or fruits from the boards at the end of the days required for completing the drying process, to yield a fully cured soft product all tissues and cells of which are intact.

References Cited

UNITED STATES PATENTS

| | | | |
|---|---|---|---|
| 1,017,411 | 2/1912 | Harris et al. | 99—204 |
| 2,192,273 | 3/1940 | Rey | 99—104 |
| 2,481,723 | 9/1949 | Coe | 99—204 |

A. LOUIS MONACELL, *Primary Examiner.*

S. DAVIS, *Assistant Examiner.*